United States Patent Office
2,899,637
Patented Aug. 11, 1959

2,899,637

APPARATUS FOR CANCELLING TURN AND YAW NOISE IN A MAGNETOMETER

James H. Stein, Southampton, Pa.

Application December 16, 1955, Serial No. 553,672

7 Claims. (Cl. 324—43)

(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for cancelling turn and yaw noise in a field detector moving in a field gradient and more particularly to a method and apparatus for accomplishing the above purpose by utilizing a compensating detector which measures deviations from a straight line flight path.

In certain applications of field detectors such as magnetometers in geophysical prospecting or submarine detection, the magnetometer detects anomalies in the magnetic field indicating the presence of a submarine or other local influence on the earth's field. In order to eliminate components of the field tending to obscure the presence of an anomaly, it is normal practice to subject the magnetometer output to a frequency selective circuit filter to suppress these components. For example, if the aircraft carrying the magnetometer has a component of speed along the earth's magnetic gradient, the magnetometer will show a continually changing field. If the filtering action differentiates the magnetometer output, and the craft is moving at constant speed, the change in field will be shown as a constant signal since the gradient is constant in any particular area. However, if the aircraft should turn or yaw, the change in field signal produced by the magnetometer will fluctuate causing in effect the introduction of a spurious signal, ripples, or turn noise. Since such ripples or turn noises are passed by the filter, it is entirely possible that they may be confused with an anomaly, or may entirely hide the presence of one. Thus, the useful sensitivity of an airborne magnetometer or any field detector is limited by spurious signals which are generated when the aircraft maneuvers.

In the case of a magnetometer used in geophysical prospecting or submarine detection, the average north-south component of the earth's magnetic gradient is of the order of ten gammas per mile. If the aircraft were to fly a circular path of two miles in diameter the magnetometer output would be a sine wave of amplitude 10 gammas. A turn of 180 degrees or 90 degrees would generate the corresponding fraction of a sine wave. When the purpose of the flight is to detect small magnetic anomalies, this turn noise is a hindrance in that it tends to obscure the desired signal and render interpretations of the record more difficult.

The only method known to date for reducing this noise is the use of a suitable frequency response in the magnetometer amplifier. However, this technique fails when the turn noise falls within the band pass of the amplifier.

The present invention makes possible the reduction or cancellation of such noise which is generated by turning or yawing of the aircraft. It is equally applicable to other means of transporting a field detector where the motion is substantially in one plane such as in the horizontal plane. This invention makes use of the fact that the amplitude of turn noise as described above is inversely proportional to the frequency for a circular motion in a gradient at a uniform speed. Apparatus for generating a voltage which is a direct function of aircraft heading is well known. However, such a voltage cannot be used to compensate for aircraft turn noise since it is of constant amplitude irrespective of the radius of the turn. Further, it does not accurately correspond to the noise function in other respects which becomes evident when considering the transition to a turn from straight flight parallel to the gradient.

It has been found that the noise function and the heading function are related to each other by virtue of the fact that one is the time integral of the other. Conversely, the heading function is the time differential of the noise function.

In the case of a magnetometer, this invention achieves compensation by generating a compensating signal proportional to the cosine of the heading of the aircraft relative to the magnetic gradient. This voltage is applied to the magnetometer signal after differentiation of the latter. Proper choice of polarity and relative gain effects compensation so long as the ground speed and gradient remain constant. Normal variations in speed and gradient are small and will detract only very little from the precision of compensation.

An object of the present invention is the provision of apparatus for modifying the output of a field detector to compensate for the effects of turn and yaw in the craft carrying the detector through a field gradient.

Another object of the present invention is the provision of apparatus for using a detector to develop a compensating signal for noise in a signal detector caused by non-linear motion of the latter through a field gradient.

A further object of the invention is the provision of apparatus for producing a compensating signal for turn noise in a magnetometer moving through a magnetic gradient and using said signal to cancel the noise component of the first derivative of the magnetometer output thereby producing an output which is not affected by non-linear movement of the vehicle carrying the magnetometer.

Still another object is to provide apparatus for eliminating the turn noise component in the output of a field detector by the use of a compensating detector which is aligned in the direction of motion of the vehicle carrying the detectors for producing the compensating signal used to make this correction.

Another object of the invention is the provision of apparatus whereby unwanted noise arising from non-linear motion of any field sensing device in a field gradient may be compensated by suitably modifying the amplitude frequency spectrum of the output of the sensing device and then combining such modified output with the output also suitably modified in amplitude frequency spectrum of a compensating detector which is placed in alignment with the instantaneous heading of the vehicle carrying the detector and then suitably modifying the amplitude frequency characteristics of the resultant combined output to provide an overall amplitude frequency response which is suitable for the purpose intended.

The exact nature of this invention as well as other objects and advantages thereof will be readily apparent from consideration of the following specification relating to the annexed drawing in which.

Figure 1:
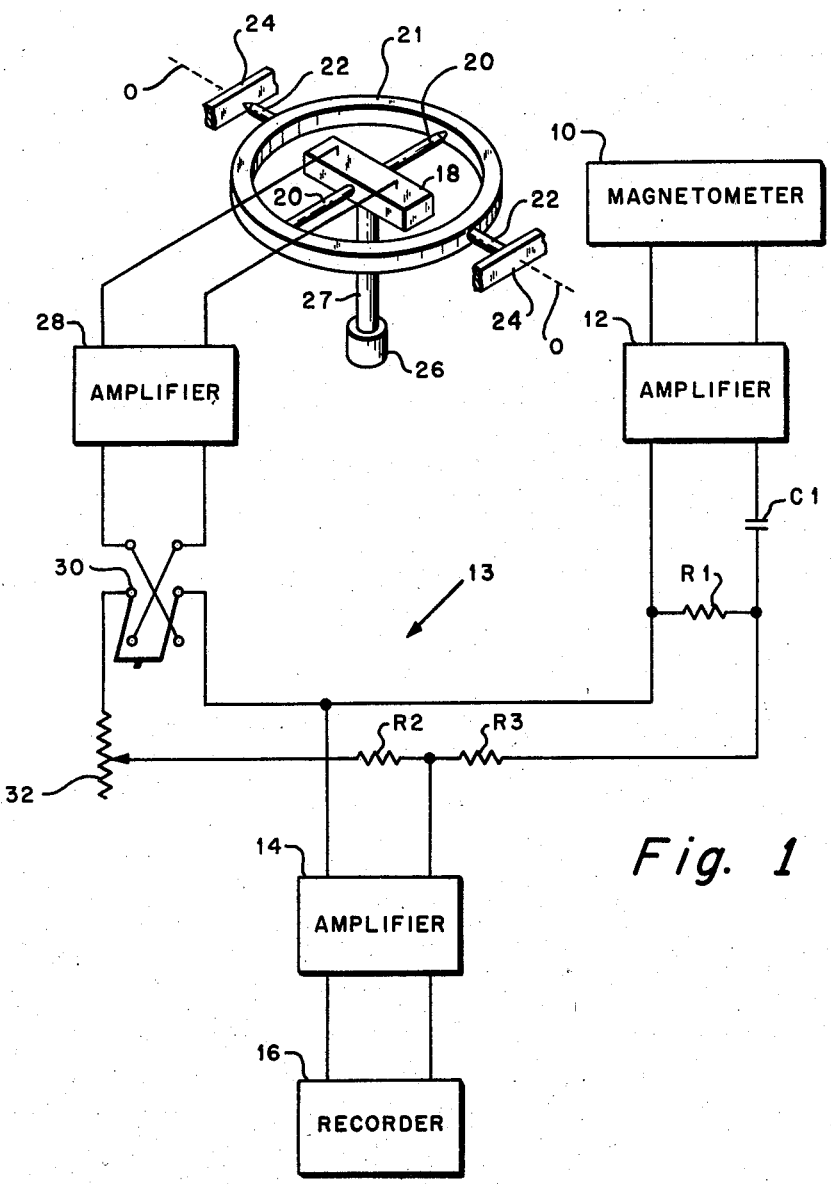
Fig. 1 shows a preferred embodiment of the invention.

In Fig. 1, signal magnetometer 10 is mounted on an aircraft in a conventional manner and is maintained in alignment with the direction of the magnetic field as is well understood in the art. The output of signal magnetometer 10 is fed to the amplifier 12 for amplification and through the high-pass filter consisting of condenser C1 and resistor R1 for differentiation of the amplifier output. The signal is then passed to the mixing network 13 consisting of resistors R2 and R3. The output of mixing network 13 is delivered to an amplifier 14 and subsequently to a recorder 16 for indicating visually or in any other desired manner the output of magnetometer 10.

Compensating magnetometer 18 is mounted in a partial gimbal system in the following manner. Rigid with magnetometer 18 are a pair of pivot pins 20 which are mounted for rotation on the gimbal frame 21 which in turn is mounted integrally on pivot pins 22 supported rotatably on the aircraft frame structure 24. A pendulum weight 26 is mounted at the end of a rod 27 hung from magnetometer 18 and by this arrangement magnetometer 18 is maintained horizontal. Axis O of the aircraft and the axis of magnetometer 18 lie in the same perpendicular plane, permitting the aircraft to pitch without affecting the horizontal position of magnetometer 18.

The output of magnetometer 18 is passed to a detector amplifier 28 and thence through a reversing switch 30 and a calibrating rheostat 32. The output across switch 30 and calibrating rheostat 32 is fed to mixing network 13 for cancellation, as will be hereinafter explained, of the noise component of the output of magnetometer 10 due to the non-linear motion of the aircraft.

The operation of the arrangement described above is as follows: Assuming level flight and letting the subscript X indicate the magnetic north direction, $G_x$ is defined as $$\frac{\Delta H_x}{\Delta_x}$$

or the horizontal gradient directed in the magnetic north direction. It is understood that the horizontal component of the magnetic gradient is directed substantially in the direction of magnetic north. $H_x$ is the horizontal component of H in the magnetic north direction and $\Delta x$ is an increment of distance in this direction.

If B is defined as the amplification constant in the compensating channel and angle $\theta$ is defined as the instantaneous heading of the aircraft with respect to magnetic north, then the output of the compensating magnetometer at the mixing network is given by $BH \cos \theta$.

Signal magnetometer 10 measures the instantaneous value of H which is, however, changing as the result of motion in the gradient $G_x$, and H may be defined as follows:

(1) $$H = H_0 + \int G_x \alpha x$$

where $H_0$ is the initial value of H.

In order to change the above equation into a form which utilizes variables which are easily measurable and controllable, the equation is differentiated with respect to time, $$\frac{dH}{dt} = 0 + G_x \frac{dX}{dt}$$

(2) $$\frac{dH}{dt} = G_x V_x = G_x V \cos \theta$$

where $V_x$ is the component of the velocity of the aircraft in the direction of magnetic north.

In order for compensation to be achieved, variable component of the compensation signal due to changing heading plus the variable component of the first differentiated magnetometer signal must be set equal to zero, as follows:

(3) $$BH \cos \theta + A \frac{dH}{dt} = 0$$

where A is an amplification constant for the signal channel.

Substituting for $$\frac{dH}{dt}$$

and solving, $\cos \theta$ drops out giving (4) $$\frac{B}{A} = \frac{-G_x V}{H_x}$$

This equation defines the ratio of the values of amplification constants A and B in the signal and compensator channels such that compensation will be effective.

$G_x$ and $H_x$ may be considered constant in an area of operation and V can be held nearly constant. If these terms change, the ratio $B/A$ must be readjusted to reflect such changes.

Mixing circuit 13 permits the turn noise component of the differentiated output of signal magnetometer 10 to be canceled. Reversing switch 30 selects by trial and error the right polarity for cancellation to occur, while rheostat 32 permits the calibration adjustments to obtain proper $B/A$ ratio.

As will be noted from Equation 3, the constants or unvarying components have been ignored. Since the equipment is designed for the detection of anomalies, the absolute values of H are ignored for the purposes of this invention, although, of course, provision may be made to tap the magnetometer output for recording absolute values.

The output of mixer 13 may be fed to recorder 16 directly after amplification since the absolute value of H is not desired. However, if desired, a conventional low-pass filter section may be included in the circuit of amplifier 14 to restore the relative amplitudes of high and low frequencies to that which existed prior to differentiation.

Of course, compensating magnetometer 18 may be replaced by any device which generates a voltage that is proportional to the cosine of the heading, as, for example, a sine-potentiometer driven by a compass.

Also, a simple loop of many turns of wire may be used as the pickup, but this provides the derivative of the cosine of the heading. In this case the output of signal magnetometer 10 must be twice differentiated before being combined with the compensating voltage in the mixing network.

As an alternate construction it may be desirable to integrate the compensation voltage rather than differentiate the signal voltage. Or, both the compensation and the signal voltages may be partially integrated and partially differentiated respectively to cause a total phase displacement of 90° thereby making the differentiation step an exact one rather than an approximation.

Figure 2:
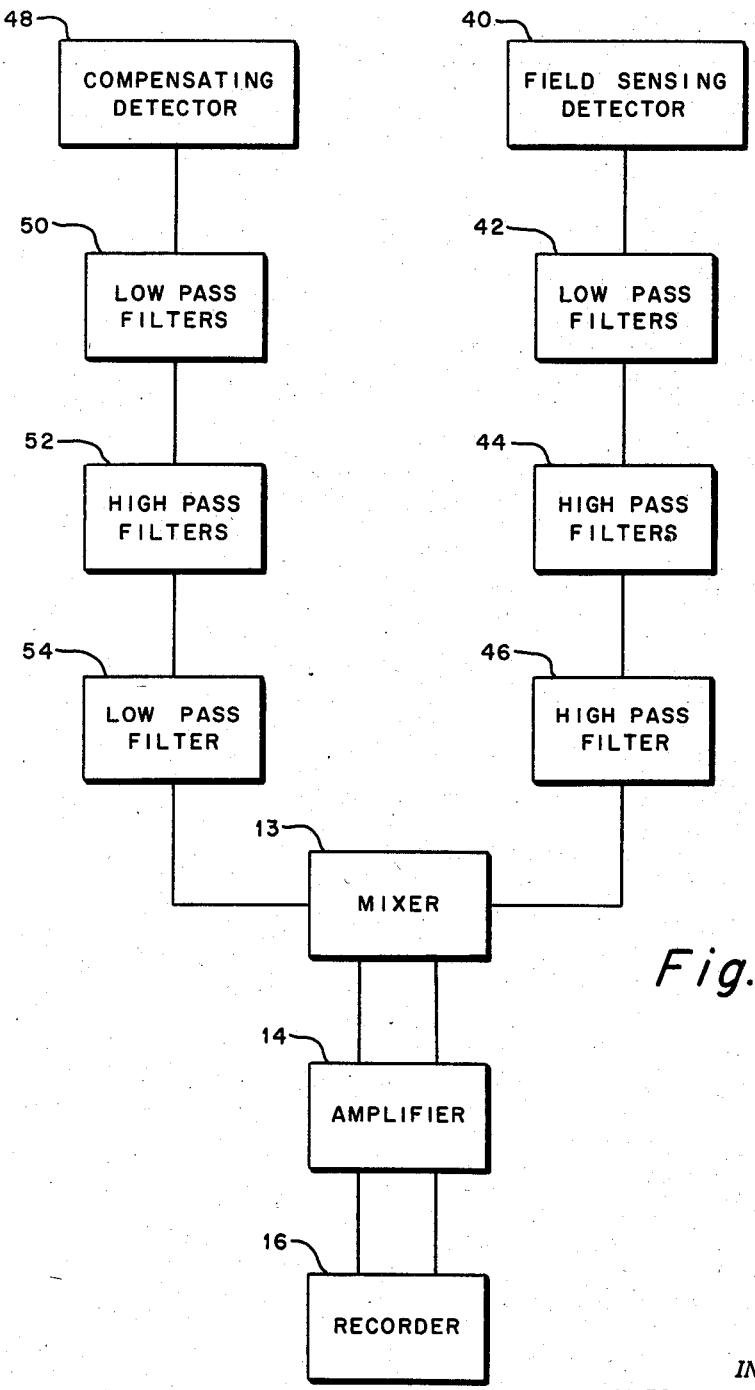
Fig. 2 illustrates the basic principle of the invention as applied to a more general case.

This modification is shown in a more general case of the invention, illustrated in Fig. 2. Field sensing device 40, which may be of any type, such as a magnetometer or a static field detector, feeds its continuous output through a system of conventional low-pass filters 42, high-pass filters 44, and a high-pass filter 46 designed to perform a partial differentiation of the signal. As is readily understood in the art, filters 42 and 44 comprise a band-pass which blocks unwanted frequencies outside of the selected band. Field sensing device 40 is automatically maintained orientated in the field although the platform ( not illustrated) which is carrying device 40 may be moving irregularly through the field, as for example, an aircraft through the earth's magnetic field. The automatic orientation referred to above is well understood in the art. It is assumed, for the purposes of this invention, that sensing device 40 is being moved substantially in a plane, such as an airplane at constant altitude. In the latter situation, however, slight changes in altitude cause errors which are negligible when compared to those caused by changes in speed and heading, and may be ignored for most purposes.

Compensating detector 48 delivers a signal which is proportional to the cosine of the angle representing the direction of motion of field sensing device 40. The output of device 48 is treated to a band-pass consisting of low-pass filters 50 and high-pass filters 52. A low-pass filter 54 accomplishes a partial integration as hereinafter explained.

Each pair of low-pass filters 42 and 50 and high-pass filters 44 and 52 are matched so that the phase angle of the signal in each filter is shifted by an equal amount, thereby maintaining the exact phase relationship between the signals. However, filters 46 and 54, are matched so that their time constants are equal and the net phase shift between the two signals totals exactly 90° with the result that the sensing signal supplied to mixer 13 is exactly one step differentially removed with respect to time from the compensating signal. The output of mixer 56 is fed into the desired band-pass filters, amplifiers, and indicating device (not illustrated). It is pointed out that in providing for this type of compensation in detector 40 which is normally provided with some filters such as 42 and 44, it is only necessary to select filters 50 and 52 in the compensation channel so as to balance the phase shift caused by the respective filters in the signal channel. High-pass filter 46 may be either added to the signal channel or selected from one of the already existing high-pass filters in the circuit.

It is thus seen that in the magnetic detection of submarines from aircraft, this invention solves one of the problems which has in the past limited the useful sensitivity of an airborne magnetometer or other field detecting instrument. It permits the elimination of spurious signals caused by maneuvering or yawing of the aircraft falling within the pass band of the detector filter.

Obviously, many modifications and variations of the present invention are possible in the light of the above teachings. It is, therefore, to be understood that within the scope of the appended claims the invention may be practiced otherwise than as specifically described.

What is claimed is:

1. A compensator for noise in a field detector moving in a field gradient caused by non-linear motion of said detector comprising means to differentiate with respect to time the output of said detector, adjusting means for continuously producing an output in accordance with the magnitude and sense of the heading of said detector, and means compensating the output of said detector by combining the output of said adjusting means with the differentiated output of said detector so as to effect cancellation of said noise.

2. The compensator of claim 1 having means for correcting said compensated output of said detector for relative unbalance of high and low frequencies introduced by the differentiation process.

3. The compensator of claim 1 in which said detector is a magnetometer.

4. The compensator of claim 1 in which the output of said adjusting means is directly proportional to the cosine of the instantaneous heading of said detector.

5. A compensator for the noise component in a magnetometer output due to non-linear motion of said magnetometer comprising adjusting means for producing a continuous output in accordance with the instantaneous direction of said motion, means for modifying both said outputs so that the modified magnetometer output is differentially once removed from the modified adjusting means output, and means for combining said modified outputs after adjustment so as to effect cancellation of said noise.

6. A compensator for noise generated in a field detector moving in a magnetic field gradient caused by non-linear motion of said detector, magnetometer means including pendulum means to maintain orientation of said magnetometer means in a predetermined plane for operably effecting an output from the magnetometer means as a function of said orientation and the heading of the detector in said magnetic field gradient, means operable to differentiate with respect to time the output of said detector, and means including attenuation and mixing means for combining the magnetometer output with the differentiated output to effect cancellation of noise components generated in the detector by non-linear motion thereof.

7. A compensator for noise generated in a field detector moving in a magnetic field gradient caused by non-linear motion of said detector, magnetometer means including pendulum means to maintain orientation of said magnetometer means in a predetermined plane for operably effecting an output from the magnetometer means as a function of said orientation and the heading of the detector in said magnetic field gradient, coupling means electrically connected to the detector to receive a detector output including generated noise components, and means including mixing means electrically operably connected to the coupling means and the magnetometer means for combining the magnetometer output with the detector output to effect cancellation of said noise components caused by said non-linear motion of the detector in a magnetic field gradient.

References Cited in the file of this patent

UNITED STATES PATENTS

| | | |
|---|---|---|
| 2,488,341 | Slonczewski | Nov. 15, 1949 |
| 2,488,389 | Felch et al. | Nov. 15, 1949 |
| 2,706,801 | Tolles | Apr. 19, 1955 |